US012665942B2

(12) United States Patent
Ahnoff

(10) Patent No.: US 12,665,942 B2
(45) Date of Patent: Jun. 23, 2026

(54) SYSTEM AND METHOD TO DETERMINE COMMUNICATION RECIPROCITY FOR A NETWORK DEVICE

(71) Applicant: Cisco Technology, Inc., San Jose, CA (US)

(72) Inventor: Mattias Ahnoff, Fornebu (NO)

(73) Assignee: Cisco Technology, Inc., San Jose, CA (US)

( * ) Notice: Subject to any disclaimer, the term of this patent is extended or adjusted under 35 U.S.C. 154(b) by 191 days.

(21) Appl. No.: 18/460,894

(22) Filed: Sep. 5, 2023

(65) Prior Publication Data

US 2025/0080599 A1 Mar. 6, 2025

(51) Int. Cl.
*H04L 65/75* (2022.01)
*G06V 20/40* (2022.01)
*G06V 40/10* (2022.01)

(52) U.S. Cl.
CPC ............ *H04L 65/764* (2022.05); *G06V 20/41* (2022.01); *G06V 40/10* (2022.01)

(58) Field of Classification Search
CPC .............................. H04L 65/764; G06V 40/10
See application file for complete search history.

(56) References Cited

U.S. PATENT DOCUMENTS

| | | | | |
|---|---|---|---|---|
| 2012/0154509 A1* | 6/2012 | Erb | ........................ | H04N 7/147 |
| | | | | 348/E7.083 |
| 2015/0002618 A1 | 1/2015 | Meek | | |
| 2017/0257400 A1 | 9/2017 | Peters et al. | | |
| 2017/0332044 A1* | 11/2017 | Marlow | ................. | G06V 20/46 |
| 2021/0028953 A1* | 1/2021 | Madaan | .............. | H04L 12/1822 |

* cited by examiner

*Primary Examiner* — Amal S Zenati
(74) *Attorney, Agent, or Firm* — Baker Botts L.L.P.

(57) ABSTRACT

A method to perform a videoconference event between a first network device and a second device may comprise detecting whether the first network device is transmitting first visual data and receiving second visual data from the second network device at the first network device. Further, the method may comprise preventing the first network device from rendering the second visual data received from the second network device in response to detecting that the first network device is not transmitting the first visual data.

17 Claims, 3 Drawing Sheets

PROCESS 300

SYSTEM 100

FIG. 1

SERVER 102

| SERVER I/O INTERFACE(S) 104 | SERVER MEMORY 120 | |
| --- | --- | --- |

SERVER PROCESSOR 106

SERVER PROCESSING ENGINE 108

SERVER STREAM CONTROLLER 110

SECURITY CHIPSET 112

WIRELESS CHIPSET 114

ROUTING CHIPSET 116

INSTRUCTIONS 122

DEVICE PROFILES 124

ENTITLEMENT(S) 126

COMM. PREFERENCES 128

DATA TYPE(S) 130

DATA STREAM(S) 132

DATA STREAM 132A

DATA STREAM 132B

DATA STREAM 132C

COMMUNICATION PARAMETERS 136

CONNECTION 140

DEVICE GROUP 160A

CONNECTION 142A

NETWORK 150

CONNECTION 142G

NETWORK DEVICE 170A

DEVICE I/O INTERFACE(S) 172

DEVICE STREAM CONTROLLER 174

DEVICE PROCESSOR 176

DEVICE PROCESSING ENGINE 180

DEVICE MEMORY 182

INSTRUCTIONS 184

LOCAL DATA STREAM(S) 186

LOCAL PROFILE 188

LOCAL DATA TYPE(S) 190

NETWORK DEVICE 170B

NETWORK DEVICE 170C

DEVICE GROUP 160G

NETWORK DEVICE 170D    NETWORK DEVICE 170E    NETWORK DEVICE 170F    NETWORK DEVICE 170G

OPERATIONAL FLOW 200

PROCESS 300

START

IDENTIFY A FIRST DATA STREAM TRANSMITTED FROM A NETWORK DEVICE — 302

IDENTIFY A SECOND DATA STREAM TO BE RECEIVED BY THE NETWORK DEVICE — 304

DETERMINE WHETHER THE FIRST DATA STREAM IS CONFIGURED TO TRANSMIT A FIRST DATA TYPE — 306

DETERMINE WHETHER THE SECOND DATA STREAM COMPRISE THE FIRST DATA TYPE — 308

SAME DATA TYPE ON FIRST STREAM AND SECOND STREAM? — 310

NO

YES

UPDATE COMMUNICATION PARAMETERS TO DISABLE ACCESS TO THE FIRST DATA TYPE — 322

UPDATE COMMUNICATION PARAMETERS TO ENABLE ACCESS TO THE FIRST DATA TYPE — 332

PREVENT THE FIRST DATA TYPE FROM BEING PRESENTED TO THE NETWORK DEVICE — 324

PRESENT THE FIRST DATA TYPE TO THE NETWORK DEVICE — 334

END

FIG. 3

SYSTEM AND METHOD TO DETERMINE COMMUNICATION RECIPROCITY FOR A NETWORK DEVICE

TECHNICAL FIELD

The present disclosure relates generally to a field of communication reciprocity and more particularly, to a system and a method to determine communication reciprocity for a network device.

BACKGROUND

In some virtual meeting settings, it might be a challenge to have attendees enable corresponding individual video streams. Missing video streams may be negative for the total meeting experience. Further, attendee's ability to remove their video streams may be unfair to attendees that have video streams enabled or are located at a physical meeting room with video enabled in a hybrid meeting setting. Further, presenters may prefer to see attendees during virtual presentations. Similarly, attendees that enable corresponding video streams may prefer to see other attendees during virtual presentations.

BRIEF DESCRIPTION OF THE DRAWINGS

For a more complete understanding of the present disclosure and for further features and advantages thereof, reference is now made to the following description taken in conjunction with the accompanying drawings, in which:

FIG. 1 illustrates an example system, according to some embodiments of the present disclosure;

FIG. 3 illustrates an example process for performing the operational flow of FIG. 2, according to some embodiments of the present disclosure.

DESCRIPTION OF EXAMPLE EMBODIMENTS

Overview

Figure 2:
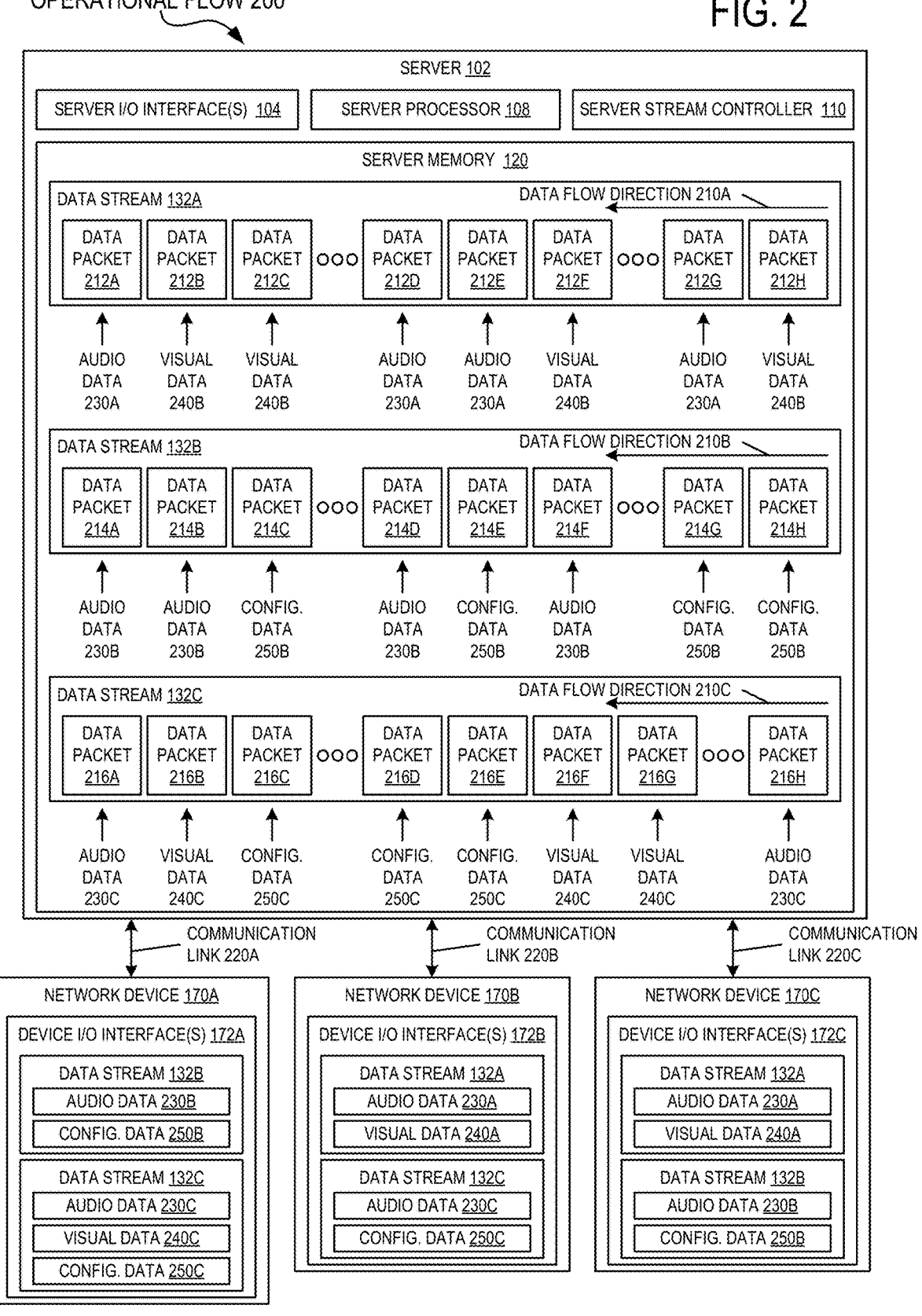
FIG. 2 illustrates an operational flow of the system of FIG. 1, according to some embodiments of the present disclosure.

In one or more embodiments, a system and a method described herein determine communication reciprocity for a network device. The system and the method are configured to monitor and regulate data types presented in the network device during data exchanges with additional network devices. Further, the system and the method may be configured to control reciprocity of data types exchanged with the network device. For example, the network device may be enabled to access a visual data type (e.g., video) and an audio data type (e.g., sound) in cases where the network device is programmed to transmit same data types. In this regard, a user operating the network device is encouraged to enable transmission of a specific data type to receive streams of the same specific data type during a virtual meeting.

In one or more embodiments, the system and the method are configured to evaluate whether the network device is enabled to transmit at least one specific data type and determine whether that specific data type may be received at the network device. In some embodiments, the system and the method may be configured to operate at a server connected to the network device via a network. In other embodiments, the system and the method may be configured to operate at the network device.

In one or more embodiments, the system and the method may be configured to determine communication reciprocity in the network device based on one or more data types exchanged by the network device. In some embodiments, the system and the method may regulate the data types received by the network device based at least in part upon the data types of data packets transmitted from the network device. Further, the system and the method may regulate the data types received by the network device based at least in part upon one or more communication preferences of the network device.

In accordance with one or more embodiments, a method to perform a videoconference event between a first network device and a second network device comprises detecting whether the first network device is transmitting first visual data and receiving second visual data from the second network device at the first network device. Further, the method comprises, in response to detecting that the first network device is not transmitting the first visual data, preventing the first network device from rendering the second visual data received from the second network device. In some embodiments, the system may be the first network device itself.

In certain cases, the method comprises, in conjunction with receiving the second visual data from the second network device at the first network device, identifying a data stream received from the second network device, the data stream comprising multiple data packets. Further, the method comprises determining whether the data packets comprises the second visual data and modifying multiple communication parameters to disable access to the second visual data received from the second network device in conjunction with preventing the first network device from rendering the second visual data.

In some cases, the method comprises detecting that the first network device is not transmitting the second visual data based at least in part upon determining that multiple communication parameters associated with the first network device comprises an indication that transmission of the second visual data is disabled at the first network device. The method further comprises determining whether the first visual data comprises at least one person, detecting whether the first network device is transmitting first visual data comprising the at least one person, and preventing the first network device from rendering the second visual data received from the second network device in response to detecting that the first network device is not transmitting the first visual data comprising the at least one person.

In yet other cases, the method comprises identifying a first data stream transmitted by the first network device and comprising first data packets, identifying a second data stream received from the second network device and comprising second data packets in conjunction with receiving the second visual data at the first network device, determining whether the first data packets comprises the first visual data, determining whether the second data packets comprises the second visual data, and detecting whether the first network device is transmitting the first visual data in response to determining that the first data packets comprises the first visual data. Further, the method comprises detecting whether the first network device received the second visual data from the second network device in response to determining that the second data packets comprises the second visual data and preventing the first network device from rendering the first visual data received from the second network device by disabling access of the first visual data in the first data stream to the first network device in response to detecting that the first network device is not transmitting the first visual data and received the second visual data from the second network device.

In some embodiments, the method comprises determining whether the first data packets comprises first configuration data, determining whether the second data packets comprises second configuration data, disabling access of the second configuration data in the second data stream to the first network device in response to determining that the first data packets comprises first configuration data and the second data packets does not comprise the second configuration data, and preventing the second configuration data in the second data stream from being presented to the first network device. In other embodiments, the first network device is configured as an attendee of the videoconference event and the second network device configured as a host of the videoconference event.

In accordance with one or more embodiments, a system or an apparatus (e.g., such as a server) may include a memory and a processor communicatively coupled to one another. In some embodiments, the memory may be configured to store multiple communication parameters configured to modify information presented at the first network device. Further, the processor may be configured to detecting whether the first network device is transmitting first visual data, receive second visual data from the second network device at the first network device, and prevent the first network device from rendering the second visual data received from the second network device in response to detecting that the first network device is not transmitting the first visual data.

In accordance with some embodiments, a non-transitory computer readable medium storing instructions that when executed by a processor cause the processor to detect whether a first network device in a videoconference event with a second network device is transmitting first visual data, receive second visual data from the second network device at the first network device, and prevent the first network device from rendering the second visual data received from the second network device in response to detecting that the first network device is not transmitting the first visual data.

Technical advantages of certain embodiments of this disclosure may include one or more of the following. The system and the method described herein provide the technical solution of controlling reciprocity of data exchanges at a given network device. Specifically, the system and the method are configured to reduce data exchanged with a network device based on the data already shared by that network device. As a result, memory resources and processing resources are optimized during communication of the network device because the network device only receives the types of data that are transmitted. For example, a network device suffering low-connectivity issues may select to disable sharing visual data (e.g., video) to prevent exchanging visual data altogether with other devices. This change may enable the network device to reduce data traffic during communication events (e.g., videoconferences, videocalls, and the like).

In addition, the system and the method described herein are integrated into practical applications of optimizing processor usage and improving power consumption in the system. Specifically, the system and the method optimize processor usage by prioritizing data exchanges preferred by a network device. Further, the system and the method optimize power consumption by automatically reducing an amount of data traffic received at the network device.

Other technical advantages will be readily apparent to one skilled in the art from the following figures, descriptions, and claims. Moreover, while specific advantages have been enumerated above, various embodiments may include all, some, or none of the enumerated advantages.

EXAMPLE EMBODIMENTS

This disclosure describes systems and methods to determine communication reciprocity for one or more network devices. In particular, this disclosure provides various systems and methods to regulate data traffic of multiple network devices exchanging data via at least one common network element (e.g., node). FIG. 1 illustrates a system 100 in which a server 102 regulates data traffic exchanged among multiple network devices 170A-170G. FIG. 2 illustrates an operational flow 200 in which data traffic is controlled at network devices 170A-170C of the system 100 of FIG. 1. FIG. 3 illustrates a process 300 to perform the operational flow 200 of FIG. 2.

FIG. 1 illustrates a system 100 configured to determine communication reciprocity for at least one of multiple network devices 170A-170G (collectively, network devices 170). The system 100 comprises a server 102 communicably coupled to the network devices 170 via a network 150. The network devices 170 may be grouped in one ore or more device groups 160A-160G (collectively, device groups 160) in accordance with corresponding locations, communication configuration, or organization policies. In FIG. 1, the server 102 is connected to the network 150 via a connection 140, the network devices 170A-170C in the device group 160A are connected to the network 150 via a connection 142A, and the network devices 170D-170G in the device group 160G are connected to the network 150 via a connection 142G. The device group 160A and the device group 160G are representative of multiple possible predefined device groups 160 in a space, distributed among multiple locations. The device groups 160 may be located in warehouses, assembly facilities, residential buildings, or private residences. The connection 142A and the connection 142G are representative of multiple possible connections 142. The device groups 160 may comprise multiple distinct or separate sub-groups. In some embodiments, the server 102 may be configured to determine communication reciprocity for one or more of the network devices 170 in any of the device groups 160. The connection 140 and the connection 142A-142G (collectively, connections 142) may be wired or wireless connections configured to enable communication between the server 102, the network 150, and the network devices 170. In other embodiments, the server 102 and the network 150 may be partially or completely located in a proximity of in the device groups 160 among the network devices 170.

In one or more embodiments, as a non-limiting example, the network devices 170 may be associated with one or more users (not shown). There may be multiple users or no users associated with the network devices 170. In some embodiments, the network devices 170 may be unassociated with any users and perform one or more roles completely autonomously from ongoing (e.g., constant) human management or intervention. For example, the network devices 170 may be videoconferencing devices in a conference room comprising one or more peripherals (e.g., displays or speakers). In some embodiments, some of the network devices 170 may be part of a sub-group of network devices 170. In an example, the network device 170A and the network device 170B may be associated with one another as communication nodes (e.g., acting as routers or anchor points) performing similar tasks such as routing connectivity signals in the device group 160A. In another example, the network device 170F and the network device 120G may be associated with one another as end points of a communication link where data streams are exchanged between the network device 170F and the network device 170G.

In the example of FIG. 1, the device group 160A is shown comprising a network device 170A, a network device 170B, and a network device 170C. Further, the device group 160G is shown comprising a network device 170D, a network device 170E, a network device 170F, a network device 170F, and a network device 170G. In this example, the device group 160A may be include the network devices 170 of an organization in a building, a device group 160B (implicitly referenced in the three dots between the device group 160A and the device group 160G) may include network devices 170 of an individual in an home, and the device group 160C (implicitly references in the three dots between the device group 160A and the device group 160G) may include devices 170 in a specific room of a building (e.g., a conference room). In another example, any of the device groups 160 include the network devices 170 associated with individuals in a specific department or sub-division of an organization.

In other embodiments, the server 102 may take any suitable physical form. As an example and not by way of limitation, the server 102 may be an embedded computer system, a system-on-chip (SOC), a single-board computer (SBC) system (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, a router device, or a combination of two or more of these. Where appropriate, the server 102 may include one or more computer systems, be unitary or distributed; span multiple locations; span multiple machines, span multiple data centers, or reside in a cloud, which may include one or more cloud components in one or more networks. Where appropriate, one or more computer systems may perform without substantial spatial or temporal limitation one or more operations of one or more methods described or illustrated herein. As an example, and not by way of limitation, the server 102 may perform in real-time or in batch mode one or more operations of one or more methods described or illustrated herein. The server 102 may perform at different times or at different locations one or more operations of one or more methods described or illustrated herein, where appropriate.

In one or more embodiments, the server 102 may comprise one or more server input (I)/output (O) interfaces 104, one or more server processors 106, a server stream controller 110, and a server memory 120. The server I/O interfaces 104 may comprise hardware, software executed by software, or a combination of both, providing one or more interfaces for communication between the server 102 and one or more I/O devices. The server 102 may include one or more of these I/O devices, where appropriate. One or more of these I/O devices may enable communication between a person and the server 102. As an example, and not by way of limitation, an I/O device may include a keyboard, keypad, microphone, monitor, mouse, printer, scanner, speaker, still camera, stylus, tablet, touch screen, trackball, video camera, another suitable I/O device, or a combination of two or more of these. An I/O device may include one or more sensors. This disclosure contemplates any suitable I/O devices and any corresponding suitable server I/O interfaces 104. Where appropriate, the server I/O interfaces 104 may include one or more device or software drivers enabling the one or more server processors 106 to drive one or more of these I/O devices. Although this disclosure describes and illustrates particular server I/O interfaces 104, this disclosure contemplates any suitable number of server I/O interfaces 104.

In one or more embodiments, the server I/O interfaces 104 may comprise a communication interface including hardware, software executed by hardware, or a combination of both providing one or more interfaces for communication (such as, for example, packet-based communication) between the server 102, the one or more network devices 170, the network 150, or one or more additional networks. As an example, and not by way of limitation, the communication interface of the server I/O interfaces 104 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable corresponding communication interface. As an example, and not by way of limitation, the server 102 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, the network devices 170 may communicate with a wireless PAN (WPAN) (such as, for example, a Bluetooth WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. The server 102 may include any suitable communication interface for any of these networks, where appropriate. Although this disclosure describes and illustrates the server I/O interfaces 104 comprising particular communication interfaces, this disclosure contemplates any suitable communication interface.

In some embodiments, the server I/O interfaces 104 may comprise storage and databases communicatively coupled to the one or more server processors 106, the server stream controller 110, and the server memory 120. The storage and databases may comprise wired connections that share an internal bandwidth for data packet transmissions inside the server 102 with the server memory 120. The storage and databases may be configured with a buffering capacity and a memory speed. The buffering capacity may indicate a buffering capacity (in bytes) that the storage and databases are capable of handling. For example, the buffering capacity may be 1,000 bytes. Further, the memory speed may indicate a processing speed (in bytes per second) at which the storage and databases is capable of handling or buffering data packets. For example, the memory speed may be 1,000 bytes per second. The storage and databases may comprise instructions and data memory for the one or more server processors 106.

In particular embodiments, the server I/O interfaces 104 may comprise a transceiver (e.g., transmitter, receiver, or a combination of both) configured to implement one or more wireless or wired connectivity protocols. In this regard, the transceiver may comprise antennas comprising hardware configured to establish one or more communication links (e.g., established via the connection 140 or the connections 142) between the server 102 and one or more of the network devices 170. Although this disclosure describes and illustrates the connection 140 and the connections 142, this disclosure contemplates any arrangement of channels for information exchange.

In other embodiments, the server I/O interfaces 104 may comprise an interconnect including hardware configured to connect the one or more server processors 106, the server stream controller 110, and the server memory 120. As an example and not by way of limitation, the interconnect may include an Accelerated Graphics Port (AGP) or a graphics bus, an Enhanced Industry Standard Architecture (EISA) bus, a front-side bus (FSB), a HyperTransport (HT) interconnect, an Industry Standard Architecture (ISA) bus, an InfiniBand interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these.

In some embodiments, the one or more server processors 106 comprise hardware for executing instructions (e.g., instructions 122), such as those making up a computer program. As an example, and not by way of limitation, to execute instructions, the one or more server processors 106 may retrieve (or fetch) the instructions from an internal register, an internal cache, or the server memory 120; decode and execute them; and then write one or more results to an internal register, an internal cache, or the server memory 120. Specifically, the one or more server processors 106 may include one or more internal caches for data, instructions, or addresses. This disclosure contemplates the one or more server processors 106 including any suitable number of internal caches, where appropriate. As an example, and not by way of limitation, the one or more server processors 106 may include one or more instruction caches, one or more data caches, and one or more translation lookaside buffers (TLBs). Instructions in the instruction caches may be copies of instructions 122 in the server memory 120, and the instruction caches may speed up retrieval of those instructions by the one or more server processors 106. Data in the data caches may be copies of data in the server memory 120 for instructions executing at the one or more server processors 106 to operate on via one or more server processing engine 108; the results of previous instructions executed at the one or more server processors 106 for access by subsequent instructions executing at the one or more server processors 106 or for writing to the server memory 120, or other suitable data. The data caches may speed up read or write operations by the one or more server processors 106. The TLBs may speed up virtual-address translation for the one or more server processors 106. In particular embodiments, the one or more server processors 106 may include one or more internal registers for data, instructions, or addresses. This disclosure contemplates the one or more server processors 106 including any suitable number of suitable internal registers, where appropriate. Where appropriate, the one or more server processors 106 may include one or more arithmetic logic units (ALUs); be a multi-core processor; or include one or more additional one or more server processors 106. Although this disclosure describes and illustrates a particular processor, this disclosure contemplates any suitable processor.

In one or more embodiments, the one or more server processors 106 include hardware, software executed by hardware, or a combination of both, configured to reprovision the network devices 170 to perform one or more tasks in the device groups 160. In some embodiments, the one or more server processors 106 are configured to determine communication reciprocity for a specific network device 170 within a specific device group 160. The one or more server processors 106 may be a routing devices configured to route resources in the network 150 to additional network devices 170. In some embodiments, the one or more server processors 106 may be included on a same card or die. In this regard, the one or more server processors 106 may be configured to determine types of data exchanged by the network devices 170. The types of data may comprise sound, video, or informational details associated with any of the network devices 170.

In other embodiments, the processing engine 108 may be software executed by hardware and configured to dynamically aid the network devices 170 to maintain synchronization parameters during synchronization operations. The processing engine 108 may be implemented by the one or more server processors 106 operating as specialized hardware accelerators. The processing engine 108 may be configured to implement networking-specific processing tasks in custom logic and achieve better performance than typical software implementations. For example, the processing engine 108 may be lookup engines (e.g., using specialized logic), cryptographic coprocessors, content inspection engines, and the like. In some embodiments, the one or more processing engines configured to operate the server stream controller 110 via execution of one or more of the instructions 122.

In one or more embodiments, the server stream controller 110 is hardware, software executed by hardware, or a combination of both configured to regulate the types of data shared among two or more of the network devices 170. In some embodiments, the server 102 may assist in establishing a communication link (examples shown in reference to FIG. 2) between any two or more network devices 170. In implementing the communication links, the server 102 may monitor data shared by each of the network devices 170 and control that specific types of data are reciprocated to at least one of the network devices 170. In this regard, the server stream controller 110 may regulate the types of data presented at a given network device 170 based at least in part upon the types of data that the given network device is configured to share. In some embodiments, the server stream controller 110 may be configured to schedule timings for transmissions of multiple network devices 170 to evaluate the data transmitted. In other embodiments, the server stream controller 110 may be configured to determine multiple data exchange settings (e.g., communication preferences 128 of a given network device 170) and determine whether the given network device 170 is configured to share a specific type of data. The server stream controller 110 may comprise a security chipset 112 configured to establish one or more physical gates/firewalls at the server 102 or at one or more of the network devices 170, a wireless chipset 114 configured to provide wireless connectivity capabilities, and a routing chipset 118 configured to regulate data exchanging capabilities by reducing or increasing access to specific types of data. In other embodiments, the security chipset 112, the wireless chipset 114, and the routing chipset 116 may be combined into a same chipset sharing common memory resources and processing resources.

In one or more embodiments, the server memory 120 includes mass storage for data or instructions. As an example, and not by way of limitation, the server memory 120 may include a hard disk drive (HDD), a floppy disk drive, flash memory, an optical disc, a magneto-optical disc, magnetic tape, or a Universal Serial Bus (USB) drive or a combination of two or more of these. The server memory 120 may include removable or non-removable (or fixed) media, where appropriate. The server memory 120 may be internal or external to a computer system, where appropriate. In particular embodiments, the server memory 120 is non-volatile, solid-state memory. In particular embodiments, the server memory 120 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates the server memory 120 as a mass storage taking any suitable physical form. The server memory 120 may include one or more storage control units facilitating communication between the one or more server processors 106 and the server memory 120, where appropriate. Although this disclosure describes and illustrates particular storage, this disclosure contemplates any suitable storage.

In one or more embodiments, the server memory 120 includes a main memory for storing the instructions 122 for the one or more server processors 106 to execute or data for the one or more server processors 106 to operate on. As an example, and not by way of limitation, the network devices 170 may load the instructions 122 from another memory in the network devices 170. The one or more server processors 106 may then load the instructions 122 from the server memory 120 to an internal register or internal cache. To execute the instructions 122, the one or more server processors 106 may retrieve the instructions 122 from the internal register or internal cache and decode them. During or after execution of the instructions 122, the one or more server processors 106 may write one or more results (which may be intermediate or final results) to the internal register or internal cache. The one or more server processors 106 may then write one or more of those results to the server memory 120. In some embodiments, the one or more server processors 106 executes only the instructions 122 in one or more internal registers or internal caches or in the server memory 120 and operates only on data in one or more internal registers or internal caches or in the server memory 120.

In one or more embodiments, the server memory 120 includes commands or data associated with one or more specific applications in addition or as part of the instructions 122. In FIG. 1, the server memory 120 comprises one or more network device profiles 124, one or more data types 130, one or more data streams 132, and multiple communication parameters 134. The one or more network device profiles 124 may comprise one or more entitlements 126 and one or more communication preferences 128. The one or more network device profiles 124 may be configured to provide access to configuration parameters for the network devices 170 to operate (e.g., perform one or more tasks) in the device groups 160. The entitlements 126 may be configured to provide one or more connectivity allowances to the network devices 170 in the device groups 160. For example, in accordance with one of the device profiles 124 corresponding to the network device 170B, the network device 170B may be a desktop computer or communication terminal configured to communicate and route signaling among some of the additional network devices 170. In this regard, the entitlements 126 associated with a corresponding network device profile 124 of the network device 170B may indicate that the network device 170B is allowed to communicate with one or more components in the network 150

(e.g., core network components or servers comprising specific network functions (NF)) to communicate and route signaling.

In some embodiments, the communication preferences 128 may be procedure or operational guidelines predefined by one or more organizations associated with the server 102. In other embodiments, the communication preferences 128 may comprise information associated with or updated by the network devices 170. In some embodiments, the communication preferences 128 are predefined data exchange parameters set in accordance with one or more organization rules and policies. For example, an organization may predefine in the communication preferences 128 of a given device profile 124 that a given network device 170 is configured to exchange both video and sound during a communication exchange. In other embodiments, the communication preferences 128 are dynamically modified data exchange parameters by a user associated with a given network device. For example, a user may set the communication preferences 128 to transmit specific data types during a communication exchange.

In one or more embodiments, the data types 130 may include classification of one or more different types of data. The data types 130 may include audio data 230, visual data 240, or configuration data 250 among others. The data types 130 may be classified from one or more of the data streams 132. The multiple data types 130 are further described in reference to the operational flow 200 of FIG. 2. In FIG. 1, the data streams 132 include a data stream 132A, a data stream 132B, and a data stream 132C among others. As shown by the consecutive dots, there may be several additional data streams 132 associated with one or more network devices 170. In some embodiments, the communication parameters 136 may include one or more configuration settings configured to modify at least one of the data streams 132. For example, the communication parameters 136 may be configured to allow, prevent, enable, or disable rendering of data at a given network device 170. In some embodiments, the communication parameters 136 may be configured to prevent rendering of data (i.e., blocking, prohibiting, and the like), render the data with a filter applied to reduce access to the data (i.e., reducing visibility of visual data, reducing volume of audio data, and the like). The filter may be a blur filter, a pixelation filter, a scramble filter, a filter that reduces contrast or brightness, or an overlay with text or other graphics blocking the data stream 132 fully or partially. The data streams 132 may be received by the server 102 via the connection 140. In some embodiments, the communication parameters 136 may be actively (e.g., dynamically or immediately) or passively (e.g., updated over time) modified by the server 102. The data streams 132 may include a data stream 132 corresponding to each network device 170 in a common communication event. A communication event may be a data exchange event such as a videoconference event comprising exchanging sound and video between two or more network devices 170. In some embodiments, the communication parameters 136 may be configured to modify one of the data streams 132.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), random access memory (RAM)- drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

In one or more embodiments, the network 150 may be a combination of electronic devices forming a multi-node mesh. As an example and not by way of limitation, one or more portions of the network 150 may include an ad hoc network, an intranet, an extranet, a virtual private network (VPN), a LAN, a wireless LAN (WLAN), a WAN, a wireless WAN (WWAN), a MAN, a portion of the Internet, a portion of the Public Switched Telephone Network (PSTN), a cellular technology-based network, a satellite communications technology-based network, another network 152, or a combination of two or more such networks.

In one or more embodiments, any one of the device groups 160 may comprise thousands of network devices 170 exchanging data with one another simultaneously, in accordance with their respective device groups 160, or in accordance with one or more sub-groups of network devices 170. Referring to the network device 170A as a non-limiting example, the network devices 170 may comprise one or more device I/O interfaces 172, a device stream controller 174, a device processor 176 comprising a device processing engine 180, and a device memory 182 comprising one or more instructions 184, one or more local data streams 186, a local profile 188, and one or more local data types 190. In one or more embodiments, the one or more network devices 170 include end-user devices such as laptops, phones, tablets, and any other suitable device that are capable of receiving, creating, processing, storing, or communicating information, including data packet transmissions. In some embodiments, the network devices 170 represents client devices or user devices that are capable of receiving real-time data packet transmissions and may include general purpose computing devices (e.g., servers, workstations, desktop computers, and the like), mobile computing devices (e.g., laptops, tablets, mobile phones, and the like), wearable devices (e.g., watches, glasses, or other head-mounted displays (HMDs), car devices, and the like), and so forth.

In one or more embodiments, the device I/O interfaces 172 may be configured to perform one or more of the operations described in reference to the server I/O interfaces 104, the device processor 176 may be configured to perform one or more of the operations described in reference to the one or more server processors 106, the device processing engine 180 may be configured to perform one or more of the operations described in reference to the server processing engine 108, and the device memory 182 may be configured to perform one or more of the operations described in reference to the server memory 120. In some embodiments, the instructions 184 may be used to perform one or more of the operations described in reference to the instructions 122. The local data streams 186 may be streams of data received by the network device 170A from the server 102 or one or more additional network devices 170. The local profile 188 may include information that identify the network device 170A in data exchanges over the network 150. In this regard, the local profile 188 may provide the server 102 and other network devices 170 with access information to exchange corresponding streams of data. For example, the local profile 188 may be interpreted by the server 102 as one of the device profiles 124. The local data types 190 may be types of data similar to those described in the data types 130.

FIG. 2 shows an example of the operational flow 200, in accordance with one or more embodiments. In FIG. 2, the server 102 regulates data types 130 exchanged among network devices 170A-170C. Each of the network devices 170A-170C is shown to communicate with the server 102 via one of the corresponding communication links 220A-220C. The network device 170A exchanges the data stream 132A with the server via the communication link 220A, the network device 170B exchanges the data stream 132B with the server via the communication link 220B, and the network device 170C exchanges the data stream 132C with the server via the communication link 220C. The server 102 receives the data streams 132A-132C via the server I/O interfaces 104. In some embodiments, the data streams 132 received by the server 102 may be parsed to identify individual types of data exchanged by each of the network devices 170. In other embodiments, the server 102 may determine whether the data streams 132 include specific data types 130 based at least in part upon one or more communication preferences 128 associated with the device profiles 124 of the network devices 170A-170C. In this regard, the data types 130 may be determined without evaluating individual data elements in the data streams 132.

For example, the communication preferences 128 may indicate a selection of "Disabled Video" representative that visual data 240 is muted via a video mute button or that a device I/O interface 172 (e.g., a camera) is covered by a physical privacy shutter (e.g., an object in front of the camera). In some embodiments, detecting that the visual data 240 is not shared by a given network device 170 may be obtained by predefining thresholds of brightness in visual data 240 obtained in a given data stream 132, predefining evaluation operations to determine whether the visual data is a static image, or predefining evaluation operations to determine whether a face (e.g., a person) is detected in the visual data. If a person is not detected for a predefined time duration (e.g., seconds, minutes, or hours) at any network device, then the server 102 may disable video for these non-active attendees. In the event of a videoconference call including only a few attendees transmitting video data, to save bandwidth, the server 102 may disable video sharing altogether. In other embodiments, to detect a person in a video stream, the video stream may be regulated to include a certain average brightness or a certain variation.

In one or more embodiments, the server processor 106 or the server stream controller 110 may be configured to identify individual pieces of data in the data streams 132. In the example of FIG. 2, the data stream 132A includes data packets 212A-212H, the data stream 132B includes data packets 214A-214H, and the data stream 132C includes data packets 216A-216H. The data streams 132A-132C may include more or less pieces of data than those shown in FIG. 2. In some embodiments, each piece of data in the data streams 132A-132C is determined to correspond to a specific data type. In response to determining the data types 130 included in each of the data streams 132A-132C, the server 102 may regulate data shared to each of the data streams 132A-C. In the data stream 132A, the data packet 212A, the data packet 212D, the data packet 212E, and the data packet 212G are determined by the server processor 106 or the server stream controller 110 to include audio data 230A. Further, the data packet 212B, the data packet 212C, the data packet 212F, and the data packet 212H are determined by the server processor 106 or the server stream controller 110 to include visual data 240A. In the data stream 132B, the data packet 214A, the data packet 214B, the data packet 214D, and the data packet 214F are determined by the server processor 106 or the server stream controller 110 to include audio data 230B. Further, the data packet 214C, the data packet 214E, the data packet 214G, and the data packet 214H are determined by the server processor 106 or the server stream controller 110 to include configuration data 250A. In the data stream 132C, the data packet 216A and the data packet 216H are determined by the server processor 106 or the server stream controller 110 to include audio data 230C. Further, the data packet 216B, the data packet 216F, and the data packet 216G are determined by the server processor 106 or the server stream controller 110 to include visual data 240C. The data packet 216C, the data packet 216D, and the data packet 216E are determined by the server processor 106 or the server stream controller 110 to include configuration data 250C.

In some embodiments, the audio data 230 is sound data or information in sound form, the visual data 240 is image data or information in image form, and the configuration data 250 are informational details associated with any of the network devices 170. In other embodiments, the configuration data 250 include identifiers associated with a corresponding source (e.g., corresponding network devices 170A-170C) of each of the data streams 132A-132C.

In the operational flow 200 of FIG. 2, the network device 170A transmits the data stream 132A, the network device 170B transmits the data stream 132B, and the network device 170C transmits the data stream 132C. In some embodiments, the network device 170B may be enabled to present pieces from data from the data stream 132A and the data stream 132C, and the network device 170C may be enabled to present pieces from data from the data stream 132A and the data stream 132B. In accordance with one or more of the communication parameters 136 regulating the data streams 132A-132C, the network device 170A may be configured to receive the data types 130 shared of the data stream 132B and the data stream 132C. For example, the device I/O interfaces 172A of the network device 170A present the audio data 230B and the configuration data 250B of the data stream 132B, and the audio data 230C, the visual data 240C and the configuration data 250C of the data stream 132C. Further, the network device 170B and the network device 170C may be configured to only receive the data types 130 that are provided by each corresponding network device 170. For example, the device I/O interfaces 172B of the network device 170B present the audio data 230A and the visual data 240A of the data stream 132A and the audio data 230C and the configuration data 250C of the data stream 132C. In another example, the device I/O interfaces 172C of the network device 170C present the audio data 230A and the visual data 240A of the data stream 132A and the audio data 230B and the configuration data 250B of the data stream 132B.

In the example of FIG. 2, the server 102 may be configured to identify the data stream 132A received via the communication link 220A, the data stream 132B received via the communication link 220B, and the data stream 132C received via the communication link 220C. In this regard, the data stream 132A includes the data packets 212 transmitted by the network device 170A, the data stream 132B includes the data packets 214 transmitted by the network device 170B, and the data stream 132C includes the data packets 216 transmitted by the network device 170C. The server processor 106 may be configured to determine the data types 130 in each of the data streams 132A-132C. In some embodiments, the server processor 106 is configured to present data types 130 to the network device 170B and the network device 170C based at least in part upon respective data types 130 transmitted. For example, the network device 170B is presented with configuration data 250C because the server processor 106 determines that the data stream 132B includes the configuration data 250B. In other embodiments, the server processor 106 is configured to prevent data types 130 from being presented to the network device 170B and the network device 170C based at least in part upon respective data types 130 transmitted. For example, the network device 170B is prevented from being presented with visual data 240C because the server processor 106 determines that the data stream 132B does not include a configuration data 240B.

In some embodiments, the communication links 220A-220C include multiple connections established to communicatively couple the network devices 170A-170C during a videoconference event. In this regard, the network device 170A may be configured as a host of the videoconference event. Further, the network device 170B and the network device 170C may be configured as attendees of a videoconference event.

In one or more embodiments, during the videoconference event, the operational flow 200 determines reciprocity for the network devices 170A-170C. In some embodiments, the reciprocity may extend to regulate presenting online statuses (e.g., via the configuration data 250) associated with the network devices 170A-170C. In some embodiments, an organization may regulate the communication parameters 136 to be implemented in all organization-related virtual meetings or videoconferences. For example, during the videoconference event, the network devices 170 operating a given meeting attendee may not be able to see video from other attendees (e.g., participants) unless the given meeting attendee enables transmission of visual data. In another example, the given meeting attendee may only see video from a host of the videoconference event but may not be able to see video from other attendees. In this example, if the given meeting attendee enables video stream, the other attendees (i.e., a non-speaking participant) with video enabled may be visible to the given meeting attendee.

In one or more embodiments, visual data 240 from a current active speaker and one or more previous active speakers may be visible at any given time. In some embodiments, non-visible video streams may be replaced by pre-selected or predefined avatars. In cases when an attendee enables visual data transmissions, any existing video streams may be visible. In some embodiments, when a given network device 170 disables video stream transmissions, the given network device 170 may present information suggesting language representative of "Enable video in order to see other attendees" or "Enable video to see the host or presenter" depending on the communication parameters 138. Similar information may be presented with opposite wording when video is not muted and the given network device 170 is one of few network devices 170 transmitting visual data 240.

FIG. 3 shows an example flowchart of a process 300 to determine communication reciprocity for a network device 170, in accordance with one or more embodiments. Modifications, additions, or omissions may be made to the process 300. The process 300 may include more, fewer, or other operations than those shown below. For example, operations may be performed in parallel or in any suitable order. While at times discussed as the server 102 or the network devices 170, the server processor 106, the server stream controller 110, or components of any of thereof, any suitable system or components of the system 100 may perform one or more operations of the process 300. For example, one or more operations of the process 300 may be implemented, at least in part, in the form of software instructions 122 of FIG. 1, stored on a non-transitory computer readable medium, tangible, machine-readable media (e.g., server memory 120 of FIG. 1) that when run by one or more processors (e.g., one or more server processors 106 of FIG. 1) may cause the one or more processors to perform operations described in operations 402-434.

Herein, referencing the operational flow 200 as a non-limiting example, the server 102 regulates the data reciprocity for the network device 170B. The process 300 starts at operation 302, where the server 102 identifies the data stream 132B transmitted from the network device 170B. At operation 304, the server 102 identifies one of the data stream 132C to be received by the network device 170C. At operation 306, the server 102 determines whether the data stream 132B is configured to include a specific data type 130 (e.g., visual data 240). At operation 308, the server 102 determines whether the data stream 132C is configured to include the same specific data type 130. In some embodiments, the server 102 determines whether the specific data type 130 is included in the in the data stream 132C based at least in part upon corresponding communication preferences 128 of the network device 170C. For example, the server 102 may determine that the network device 170C includes the visual data 240C based on determining a setting representative of disabling visual data 240C.

The process 300 continues at operation 310, where the server 102 determines whether the data stream 132B and the data stream 132C include the visual data 240. If the server 102 determines that the data stream 132B and the data stream 132C do not include the same data type 130 (e.g., NO), the process 300 proceeds to operation 322. If the server 102 determines that the data stream 132B and the data stream 132C include the same data type 130 (e.g., YES), the process 300 continues to operation 332.

At operation 322, the server 102 updates the communication preferences 128 to disable access to the visual data 240C of the data stream 132C. The process 300 ends at operation 324, where the server 102 prevents the visual data 240C of the data stream 132C from being presented to the network device 170B. At operation 332, the server 102 updates the communication preferences 128 to enable access to the visual data 240C of the data stream 132C. The process 300 ends at operation 334, where the server 102 presents the visual data 240C of the data stream 132C to the network device 170B.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figures above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate operations, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

The invention claimed is:

1. A method performed by a processor in a first network device to perform a videoconference event between the first network device and a second network device, comprising:

detecting that the first network device is not transmitting first visual data;

receiving second visual data from the second network device at the first network device;

after detecting that the first network device is not transmitting the first visual data, blocking the first network device from rendering the second visual data received from the second network device;

identifying a first data stream transmitted by the first network device and comprising a first plurality of data packets;

in conjunction with receiving the second visual data at the first network device, identifying a second data stream received from the second network device and comprising a second plurality of data packets;

determining whether the first plurality of data packets comprises the first visual data;

determining whether the second plurality of data packets comprises the second visual data;

in response to determining that the first plurality of data packets comprises the first visual data, detecting whether the first network device is transmitting the first visual data;

in response to determining that the second plurality of data packets comprises the second visual data, detecting whether the first network device received the second visual data from the second network device; and in response to detecting that the first network device is not transmitting the first visual data and received the second visual data from the second network device, preventing the first network device from rendering the first visual data received from the second network device by disabling access of the first visual data in the first data stream to the first network device.

2. The method of claim 1, further comprising:

in conjunction with receiving the second visual data from the second network device at the first network device, identifying a data stream received from the second network device, the data stream comprising a plurality of data packets;

determining whether the plurality of data packets comprises the second visual data; and in conjunction with blocking the first network device from rendering the second visual data, modifying a plurality of communication parameters to disable access to the second visual data received from the second network device.

3. The method of claim 1, further comprising:

detecting that the first network device is not transmitting the second visual data based at least in part upon determining that a plurality of communication parameters associated with the first network device comprises an indication that transmission of the second visual data is disabled at the first network device.

4. The method of claim 1, further comprises:

determining whether the first visual data comprises at least one person;

detecting whether the first network device is transmitting first visual data comprising the at least one person; and blocking the first network device from rendering the second visual data received from the second network device in response to detecting that the first network device is not transmitting the first visual data comprising the at least one person.

5. The method of claim 1, further comprising:

determining whether the first plurality of data packets comprises first configuration data;

determining whether the second plurality of data packets comprises second configuration data;

in response to determining that the first plurality of data packets comprises first configuration data and the second plurality of data packets does not comprise the second configuration data, disabling access of the second configuration data in the second data stream to the first network device; and blocking the second configuration data in the second data stream from being presented to the first network device.

6. The method of claim 1, wherein:

the first network device is configured as an attendee of the videoconference event; and the second network device configured as a host of the videoconference event.

7. A first network device in a videoconference event with a second network device, comprising:

a memory comprising:

a plurality of communication parameters configured to modify information presented at the first network device; and a processor communicatively coupled to the memory and configured to:

detect that the first network device is not transmitting first visual data;

receive second visual data from the second network device at the first network device;

after detecting that the first network device is not transmitting the first visual data, block the first network device from rendering the second visual data received from the second network device;

identify a first data stream transmitted by the first network device and comprising a first plurality of data packets;

in conjunction with receiving the second visual data at the first network device, identify a second data stream received from the second network device and comprising a second plurality of data packets;

determine whether the first plurality of data packets comprises the first visual data;

determine whether the second plurality of data packets comprises the second visual data;

in response to determining that the first plurality of data packets comprises the first visual data, detect whether the first network device is transmitting the first visual data;

in response to determining that the second plurality of data packets comprises the second visual data, detect whether the first network device received the second visual data from the second network device; and in response to detecting that the first network device is not transmitting the first visual data and received the second visual data from the second network device, block the first network device from rendering the first visual data received from the second network device by disabling access of the first visual data in the first data stream to the first network device.

8. The first network device of claim 7, wherein the processor is further configured to:

in conjunction with receiving the second visual data from the second network device at the first network device, identify a data stream received from the second network device, the data stream comprising a plurality of data packets;

determine whether the plurality of data packets comprises the second visual data; and in conjunction with blocking the first network device from rendering the second visual data, modify the plurality of communication parameters to disable access to the second visual data received from the second network device.

9. The first network device of claim 7, wherein the processor is further configured to:

detect that the first network device is not transmitting the first visual data based at least in part upon determining that the plurality of communication parameters comprises an indication that transmission of the first visual data is disabled at the first network device.

10. The first network device of claim 7, wherein the processor is further configured to:

determine whether the first visual data comprises at least one person;

detecting whether the first network device is transmitting first visual data comprising the at least one person; and block the first network device from rendering the second visual data received from the second network device in response to detecting that the first network device is not transmitting the first visual data comprising the at least one person.

11. The method of claim 7, wherein:

determine whether the first plurality of data packets comprises first configuration data;

determine whether the second plurality of data packets comprises second configuration data;

in response to determining that the first plurality of data packets comprises first configuration data and the second plurality of data packets does not comprise the second configuration data, disable access of the second configuration data in the second data stream to the first network device; and block the second configuration data in the second data stream from being presented to the first network device.

12. The first network device of claim 7, wherein:

the first network device is configured as an attendee of the videoconference event; and the second network device configured as a host of the videoconference event.

13. A non-transitory computer readable medium storing instructions that when executed by a processor cause the processor to:

detect that a first network device in a videoconference event with a second network device is not transmitting first visual data;

receive second visual data from the second network device at the first network device;

after detecting that the first network device is not transmitting the first visual data, block the first network device from rendering the second visual data received from the second network device;

identify a first data stream transmitted by the first network device and comprising a first plurality of data packets;

in conjunction with receiving the second visual data at the first network device, identify a second data stream received from the second network device and comprising a second plurality of data packets;

determine whether the first plurality of data packets comprises the first visual data;

determine whether the second plurality of data packets comprises the second visual data;

in response to determining that the first plurality of data packets comprises the first visual data, detect whether the first network device is transmitting the first visual data;

in response to determining that the second plurality of data packets comprises the second visual data, detect whether the first network device received the second visual data from the second network device; and in response to detecting that the first network device is not transmitting the first visual data and received the second visual data from the second network device, block the first network device from rendering the first visual data received from the second network device by disabling access of the first visual data in the first data stream to the first network device.

14. The non-transitory computer readable medium of claim 13, wherein the processor is further caused to:

in conjunction with receiving the second visual data from the second network device at the first network device, identify a data stream received from the second network device, the data stream comprising a plurality of data packets;

determine whether the plurality of data packets comprises the second visual data; and in conjunction with blocking the first network device from rendering the second visual data, modify a plurality of communication parameters to disable access to the second visual data received from the second network device.

15. The non-transitory computer readable medium of claim 13, wherein the processor is further caused to:

detect that the first network device is not transmitting the second visual data based at least in part upon determining that a plurality of communication parameters associated with the first network device comprises an indication that transmission of the second visual data is disabled at the first network device.

16. The non-transitory computer readable medium of claim 13, wherein the processor is further caused to:

determine whether the first visual data comprises at least one person;

detect whether the first network device is transmitting first visual data comprising the at least one person; and block the first network device from rendering the second visual data received from the second network device in response to detecting that the first network device is not transmitting the first visual data comprising the at least one person.

17. The method of claim 13, wherein:

determine whether the first plurality of data packets comprises first configuration data;

determine whether the second plurality of data packets comprises second configuration data;

in response to determining that the first plurality of data packets comprises first configuration data and the second plurality of data packets does not comprise the second configuration data, disable access of the second configuration data in the second data stream to the first network device; and block the second configuration data in the second data stream from being presented to the first network device.

* * * * *